(12) United States Patent
Herbeck et al.

(10) Patent No.: US 9,135,251 B2
(45) Date of Patent: *Sep. 15, 2015

(54) GENERATING SIMULATED CONTAINMENT REPORTS OF DYNAMICALLY ASSEMBLED COMPONENTS IN A CONTENT MANAGEMENT SYSTEM

(71) Applicant: International Business Machines Corporation, Armonk, NY (US)

(72) Inventors: David G. Herbeck, Rochester, MN (US); John E. Petri, St. Charles, MN (US)

(73) Assignee: International Business Machines Corporation, Armonk, NY (US)

(*) Notice: Subject to any disclaimer, the term of this patent is extended or adjusted under 35 U.S.C. 154(b) by 368 days.

This patent is subject to a terminal disclaimer.

(21) Appl. No.: 13/790,332

(22) Filed: Mar. 8, 2013

(65) Prior Publication Data

US 2013/0185312 A1    Jul. 18, 2013

Related U.S. Application Data

(63) Continuation of application No. 12/512,111, filed on Jul. 30, 2009, now Pat. No. 8,572,473.

(51) Int. Cl.
*G06F 17/00* (2006.01)
*G06F 17/30* (2006.01)
*G06F 17/21* (2006.01)

(52) U.S. Cl.
CPC .......... *G06F 17/30011* (2013.01); *G06F 17/21* (2013.01); *G06F 17/30716* (2013.01)

(58) Field of Classification Search
CPC .......... G06F 17/30011; G06F 17/2229; G06F 17/2288

USPC .................................. 715/200, 229, 272, 253
See application file for complete search history.

(56) References Cited

U.S. PATENT DOCUMENTS

| | | |
|---|---|---|
| 3,997,880 A | 12/1976 | Chen et al. |
| 6,253,204 B1 | 6/2001 | Glass et al. |
| 2001/0025284 A1 | 9/2001 | Seol et al. |
| 2003/0158953 A1 | 8/2003 | Lal |
| 2005/0240827 A1 | 10/2005 | Sankaran et al. |
| 2005/0262063 A1 | 11/2005 | Conboy et al. |
| 2005/0289446 A1 | 12/2005 | Moncsko et al. |
| 2006/0294052 A1 | 12/2006 | Kulkami et al. |
| 2007/0083610 A1 | 4/2007 | Treder et al. |
| 2007/0294631 A1 | 12/2007 | Wiseman |
| 2008/0263193 A1 | 10/2008 | Chalemin et al. |
| 2009/0132524 A1 | 5/2009 | Stouffer et al. |
| 2009/0172154 A1 | 7/2009 | Aviles Sanchez et al. |
| 2011/0153631 A1 | 6/2011 | Kondasani |

*Primary Examiner* — Scott Baderman
*Assistant Examiner* — Howard Cortes
(74) *Attorney, Agent, or Firm* — Martin & Associates, LLC; Derek P. Martin

(57) ABSTRACT

A content management system (CMS) uses a simulated containment report generation mechanism to generate a simulated containment report for elements in the repository based on logged properties that represent potential use of the element during dynamic content delivery that are not represented in formal relationships in the content management system. Properties such as probability, popularity, and recent usage that are not explicit relationships between parent documents and child elements are logged and used to determine which document maps may potentially reuse a selected element. In this manner a simulated containment report can be created for an element that allows the user to see the document maps that are most likely to include the element.

9 Claims, 13 Drawing Sheets

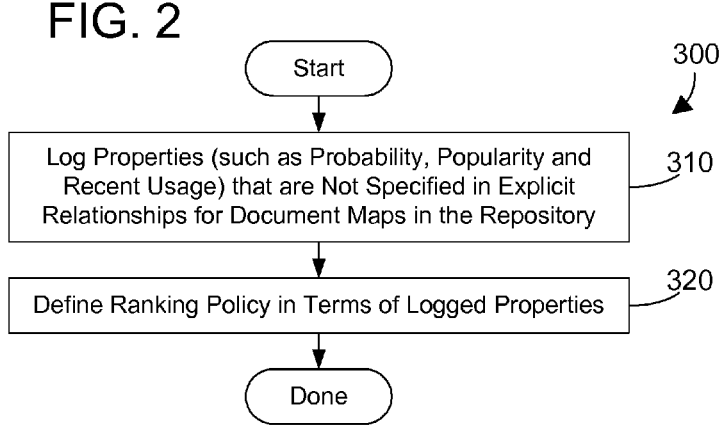
FIG. 2
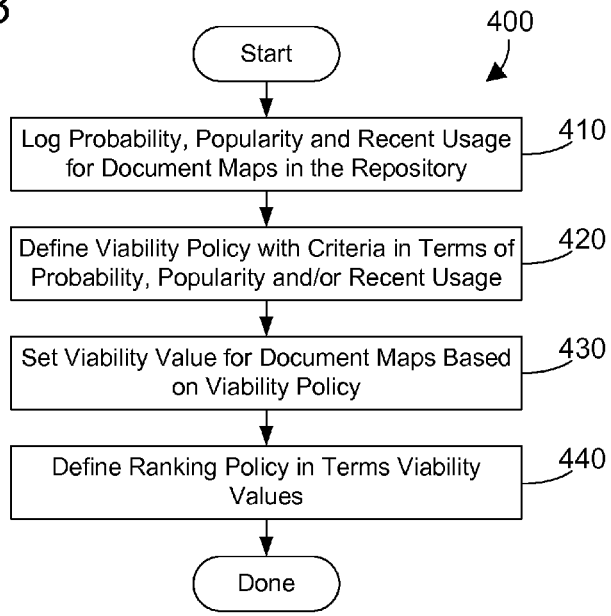
FIG. 3
FIG. 4

```
<ViabilityPolicy>
    <ElementViability degree="high">
        <Condition operator="AND">
            <Condition type="probability" ref="prob_policy1" operator="EQ">
                <Value val="high"/>
            </Condition>
            <Condition type="reuse_percentage" operator="GT">
                <Value val="50"/>
            </Condition>
            <Condition type="element_property" name="last_used" operator="GT">
                <Value val="12/10/2007"/>
            </Condition>
        </Condition>
    </ElementViability>
    <ElementViability degree="medium">
        <Condition operator="OR">
            <Condition operator="OR">
                <Condition type="probability" ref="prob_policy1" operator="NE">
                    <Value val="high"/>
                </Condition>
                <Condition operator ="AND">
                    <Condition type="reuse_percentage" operator="LE">
                        <Value val="50"/>
                    </Condition>
                    <Condition type="reuse_percentage" operator="GE">
                        <Value val="25"/>
                    </Condition>
                </Condition>
            </Condition>
            <Condition operator="AND">
                <Condition type="element_property" name="last_used"
                operator="GT">
                    <Value val="11/01/2007"/>
                </Condition>
                <Condition type="element_property" name="last_used"
                operator="LT">
                    <Value val="01/01/2008"/>
                </Condition>
            </Condition>
        </Condition>
    </ElementViability>
    <ElementViability degree = "low">                              1800
    </ElementViability>
</ViabilityPolicy>
```

FIG. 18

GENERATING SIMULATED CONTAINMENT REPORTS OF DYNAMICALLY ASSEMBLED COMPONENTS IN A CONTENT MANAGEMENT SYSTEM

BACKGROUND

1. Technical Field

This disclosure generally relates to content management systems, and more specifically relates to generating simulated containment reports for elements that are dynamically assembled in a content management system.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content may be subsequently processed by the CMS according to predefined rules. A user may also check out content from the repository, or link to content in the repository while generating content. The rules in a CMS assure that content that comes into or out of the system or that is linked to meets desired criteria specified in the rules.

One way for known content management systems to create documents is by dynamic compound document assembly. Dynamic compound document assembly involves retrieving elements from the repository and assembling the elements into a parent document. For example, this might occur according to an assembly template or from manual ad hoc assembly. The assembly template dictates which elements are to be retrieved and where the elements are supposed to be linked into the parent document. The parent document contains explicit relationships as formal links to each of the elements in the parent document. When the parent document is checked into the repository, the formal links are all checked against applicable rules, thereby enforcing referential integrity.

Today, content management systems are moving to provide dynamic content delivery. Dynamic content delivery refers to the ability to assemble components "on-the-fly." Dynamic content delivery may involve receiving user input, and then dynamically assembling a document to match the document requested by the user. In the alternative, dynamic content delivery may involve an automated process for dynamically assembling a document without user input, for example, based on some criteria. Document maps provide a backbone to describe how the dynamically assembled document is generated, but the explicit relationships (e.g., formal links) between parent documents and the elements do not exist. The lack of explicit relationships provides for greater flexibility in creating documents, and allows the CMS to receive input from a user or from other parameters and assemble documents dynamically. For example, a customer document may be automatically generated and rendered to a user's web browser based on data the user enters into a form.

One of the problems with dynamic content delivery is that referential integrity can be compromised. Without the explicit relationships between parent and child elements, and because a dynamically generated document may not be persisted or actually manifested in the repository, elements required to create certain documents could be deleted, which would make it impossible to create that document. In content management systems where there is an explicit relationship (e.g., formal link) between parent and child documents, the owner of the parent document could be alerted when a child document is deleted, and/or the deletion of the child document could be prevented. This is not the case in dynamic content delivery as the parent document (i.e. document map) never knows which child elements it will be including when it prepares the document. Without a way to enforce referential integrity when deleting elements in a repository, the computer industry cannot fully utilize dynamic content delivery in a content management system.

One of the abilities available to a content management system is the ability to run a containment report for documents that include formal links between elements. A user can query the repository for all parent documents that contain a specific element. However, in documents that are delivered via dynamic content delivery, the formal links do not exist. Without the formal link between parent and child elements, a traditional containment will not include relationships between elements in a document that was generated and delivered via dynamic content delivery. Since the elements in a document delivered via dynamic content delivery is not specifically linked to any parent document via formal links in the content management system, it is difficult to tell which documents actually include the element. As a result, a containment report for elements in a document delivered via dynamic content delivery cannot be generated. Without a way to account for dynamic content delivery when running containment reports, content management systems will not be able to determine when elements are used and are not used in dynamic content delivery.

BRIEF SUMMARY

A content management system (CMS) uses a simulated containment report generation mechanism to generate a simulated containment report for elements in the repository that do not have formal links. The simulated containment report includes information regarding links between elements that were dynamically generated during dynamic content delivery. Document map properties such as probability, popularity, and recent usage that are not explicit relationships between parent documents and child elements are logged as documents are generated and delivered via dynamic content delivery. A ranking policy is then defined in terms of the logged document map properties. When a request to generate a simulated containment report for an element is received, the simulated containment report generation mechanism checks each document maps' logged properties against the ranking policy. If a document map's logged properties satisfy the ranking policy, the document map is included in the simulated containment report. If a document map's logged properties do not satisfy the ranking policy, the document map is not included in the simulated containment report. The results in the simulated containment report are ranked/organized according to criteria in the ranking policy. In this manner a simulated containment report can be created for an element that allows the user to see the document maps that are most likely to include the element, even when there are no explicit relationships between the element and the document maps in the content management system.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 2 shows examples of properties that could be logged;

FIG. 3 is a flow diagram of a method for defining a ranking policy in terms of logged properties that are not specified in explicit relationships in the repository;

FIG. 4 is a flow diagram of a method that represents one specific implementation of method 300 in FIG. 3;

FIG. 18 shows a sample viability policy for the specific example herein;

DETAILED DESCRIPTION

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

Figure 1:
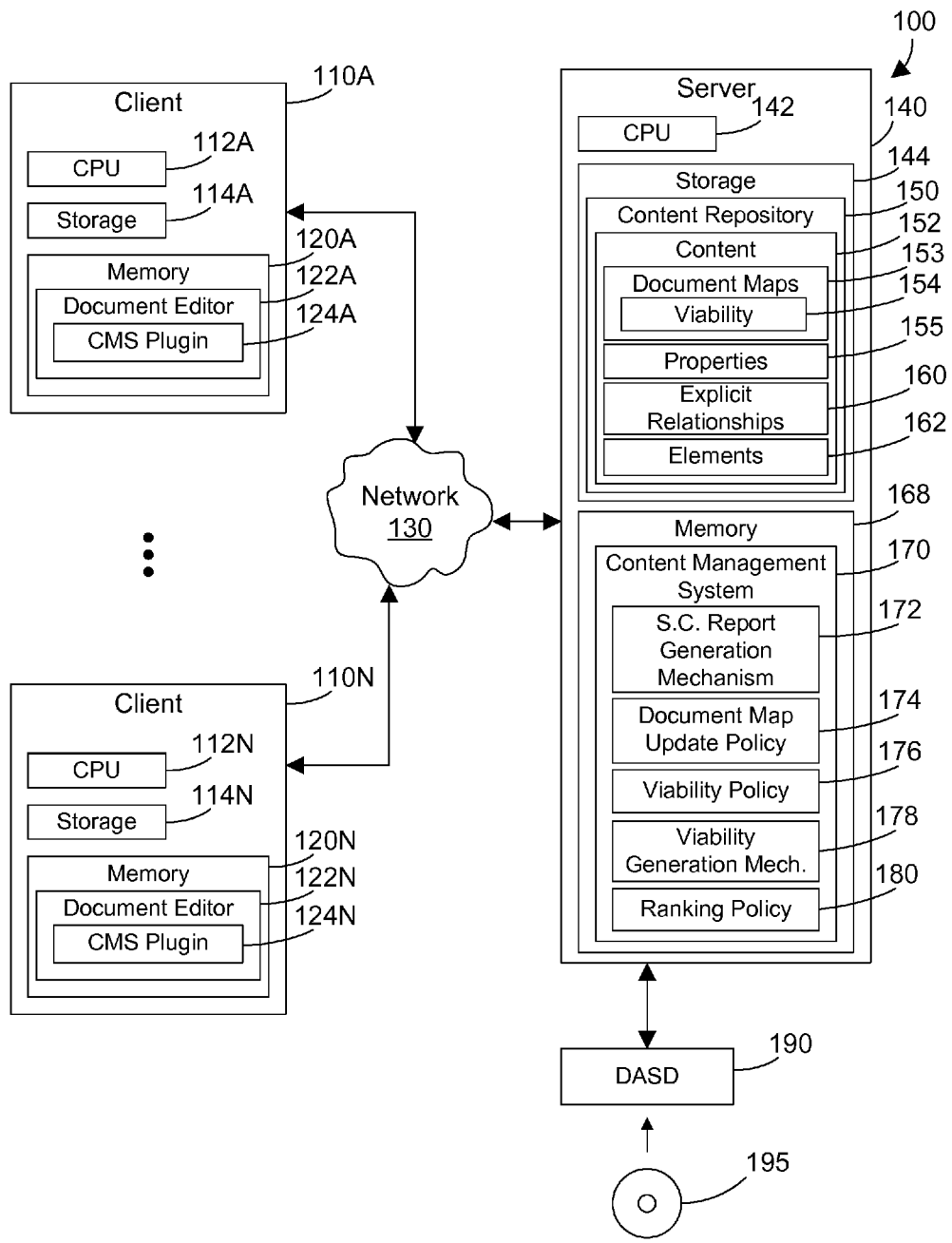
FIG. 1 is a block diagram of a networked computer system that includes a server computer system that has a content management system that includes a simulated containment report generation mechanism that generates a simulated containment report for a selected element in the repository that shows the document maps in the repository that have logged properties that satisfy a ranking policy.

Referring to FIG. 1, networked computer system 100 includes multiple clients, shown in FIG. 1 as clients 110A, . . . , 110N, coupled to a network 130. Each client preferably includes a CPU, storage, and memory that contains a document editor, and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

The CMS 170 resides in the main memory 168 of a server computer system 140 that also includes a CPU 142 and storage 144 that includes a content repository 150 that holds content 152 managed by the CMS 170. Content 152 may include one or more document maps 153, properties 155, explicit relationships 160, and elements 162. Each of the document maps 153 preferably contains a viability value 154. Viability value 154 indicates the usefulness of each document map. The explicit relationships 160 are formal links between objects in the repository. Examples of explicit relationships 160 are links between a compound assembly document (i.e., parent) and its constituent child elements. Document maps 153 define documents that may be assembled on-the-fly, and as such, the document maps 153 typically lack explicit relationships to child elements. As used in the disclosure and claims herein, the term "document map" means any type of skeleton, backbone, or template that indicates how to link elements into a document, and the term "element" means any section or portion of a document map that may be individually displayed or accentuated, whether actually in the document or linked to the document. Note that a document map may be very similar to known assembly templates, or may be very different, providing much greater flexibility in assembling documents on-the-fly.

Properties 155 represent properties of document maps or elements that may be logged by the content management system 170. Properties 155 may be stored in the document maps or elements or may be stored in a data structure separate from the document maps or elements. In addition, some of properties 155 may be stored in the document maps or elements while others are stored separate from the document maps or elements. Suitable properties 155 that may be logged by the CMS include probability 256, popularity 257 and recent usage 258 as shown in FIG. 2. As used in the disclosure and claims herein, "probability" means the likelihood a particular document map will use an element type in a particular situation, "popularity" is the measure of a particular document map's reuse of a certain element or type of element in the CMS, or popularity of the document map itself, and "recent usage" means the date and time the document map last used an element of the same type. One suitable way to calculate probability is the time since the document map has been created. Another suitable way to calculate probability is a ratio of the document maps in the repository that use an element of the same type to the total number of document maps in the repository. The disclosure and claims herein extend to any way to determine the probability that an element will be reused. Of course, any suitable property could be logged. The disclosure and claims herein expressly extend to the logging of any suitable properties by the CMS that are not defined in explicit relationships 160.

One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes a simulated containment report generation mechanism 172, a document map update policy 174, a viability policy 176, a viability generation mechanism 178, and a ranking policy 180. The viability policy 176 preferably defines criteria for setting a viability value for a document map based on the logged properties 155 corresponding to the document map. Simulated containment report generation mechanism 172 checks the logged properties 155 against ranking policy 180, and adds the document map to a simulated containment report if ranking policy 180 allows the document map to be added. In one specific implementation, the logged properties 155 are used to generate a viability value 154 according to the viability policy 176. In this specific implementation, the simulated containment report generation mechanism 172 checks the viability value 154 against the ranking policy 180, and adds the document map to the simulated containment report if ranking policy 180 allows the document map to be added.

Document map update policy 174 indicates when viability value 154 should be updated. Document map update policy 174 could be defined by a user, or autonomically by the system according to system trends. One suitable implementation updates the viability value 154 after a certain time interval has passed, such as once per day. Another suitable implementation updates the viability value when the document map is used. Yet another suitable implementation updates the viability value when the request to generate a simulated containment report is received. The specification and claims herein extend to any way to define when the viability value for a document map should be updated.

Viability policy 176 specifies criteria for determining a viability value for a document map based on the logged properties 155 for the document map. The viability generation mechanism 178 generates the viability value 154 for a document map based on the logged properties 155 for the document map and based on the criteria specified in the viability policy 176. In the most preferred implementation, the viability value 154 is specified in fuzzy values such as "low", "medium" and "high."

Ranking policy 180 defines criteria for when a document map can be added to a simulated containment report according to the document map's logged properties 155. In the most preferred implementation described herein, ranking policy 180 is specified in terms of a viability value 154 that is derived from the logged properties 155 and viability policy 176. For example, the ranking policy could allow adding a document map to a simulated containment report with 'high' or 'medium' viability, and not allow a document map with 'low' viability to be added to the simulated containment report. Additionally, ranking policy 180 could define that the results in the simulated containment report should be ranked according to one or more properties 155. For example, ranking policy 180 could define that only document maps with 'high' or 'medium' viability should be added to a simulated containment report, and that the document maps in the simulated containment report should be ranked according to the document maps' popularity (e.g. sample ranking policy 2100 in FIG. 21).

In FIG. 1, repository 150 is shown separate from content management system 170. In the alternative, repository 150 could be within the content management system 170. Regardless of the location of the repository 150, the content management system 170 controls access to content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 168 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 168, storage 144 and DASD device 190. Therefore, while data, the operating system, and content management system 170 may reside in main memory 168, those skilled in the art will recognize that these items are not necessarily all completely contained in main memory 168 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 168. Main memory 168 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The CMS herein may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Referring to FIG. 3, a method 300 shows steps for defining a ranking policy in terms of logged properties. Properties relating to the document maps that are not specified in explicit relationships for the document maps are logged (step 310). A ranking policy is then defined in terms of the logged properties (step 320). In this manner the ranking policy is defined based on logged properties of document maps that are not represented in the explicit relationships in the repository, thereby taking into account logged usage of elements by document maps that lack the explicit relationships between parent and child elements.

Referring to FIG. 4, a method 400 represents one suitable implementation for method 300 in FIG. 3. The probability, popularity and recent usage for document maps in the repository are logged (step 410). A viability policy (e.g., 176 in FIG. 1) is then defined with criteria in terms of the logged probability, popularity and/or recent usage (step 420). Note that the viability policy may specify any or all of the logged properties. A viability value (e.g., 154 in FIG. 1) for a document map is then set based on the viability policy (step 430). The ranking policy (e.g., 180 in FIG. 1) is then defined, preferably in terms viability values (step 440). Note the ranking policy may include parameters defining how to rank the results in a simulated containment report. The specific implementation shown in method 400 in FIG. 4 provides an efficient way to log properties for document maps that are not included in the explicit relationships 160 so that a simulated containment report can be created for on-the-fly document compilation.

Figure 5:
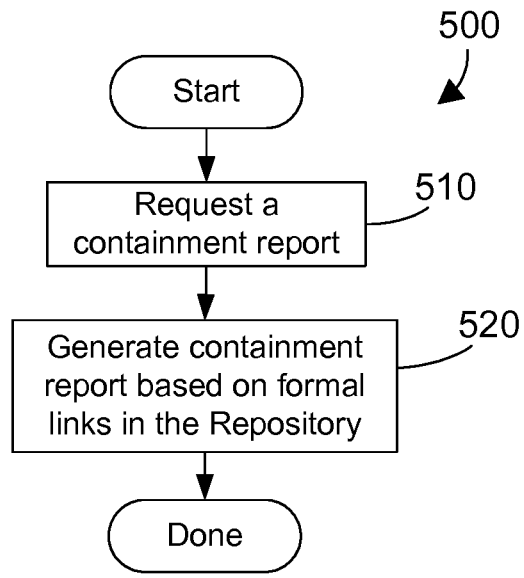
FIG. 5 is a flow diagram of a prior art method for generating a containment report for a selected element.

Referring to FIG. 5, a method 500 shows the prior art method for generating containment reports. First a containment report is requested for a selected element in the repository (step 510). The containment report is then generated based on formal links in the repository (step 520) and method 500 is done. A containment report shows all the parent documents that contain the selected element. Note that if the selected element does not contain formal links (e.g. explicit relationships 160), then the containment report will be empty and will be useless to the user.

Figure 6:
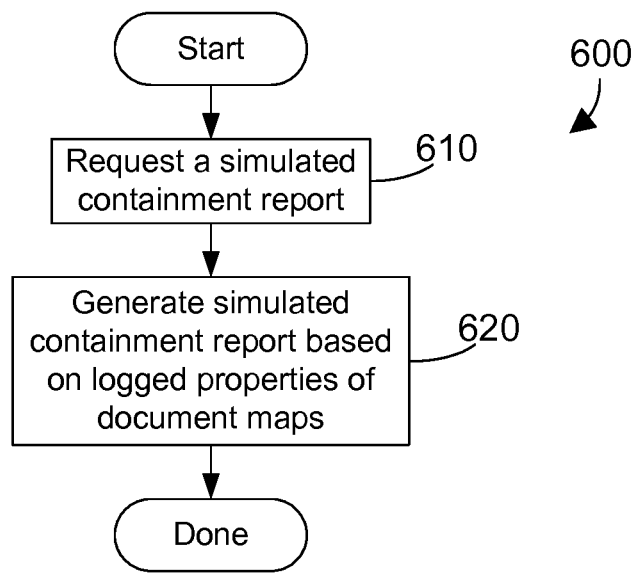
FIG. 6 is a flow diagram of a method for generating a simulated containment report for a selected element.

Referring to FIG. 6, a method 600 shows a method for generating simulated containment reports for a selected element. A simulated containment report is requested for the selected element (step 610). A simulated containment report is generated based on the logged properties of the documents maps as relates to the selected element (step 640). While methods 500 and 600 are shown as separate and distinct in the figures, one skilled in the art could perform one or both methods. By performing method 500 in FIG. 5, a prior art containment report will show the document maps that reference the selected element according to explicit relationships defined in the CMS. By performing method 600 in FIG. 6, a simulated containment report will show the document maps that potentially reference the selected element according to logged properties that do not represent explicit relationships defined in the CMS. Note that a user could execute both methods 500 and 600 to see all of the potential uses of a selected element, both based on explicit relationships and based on logged properties.

Figure 7:
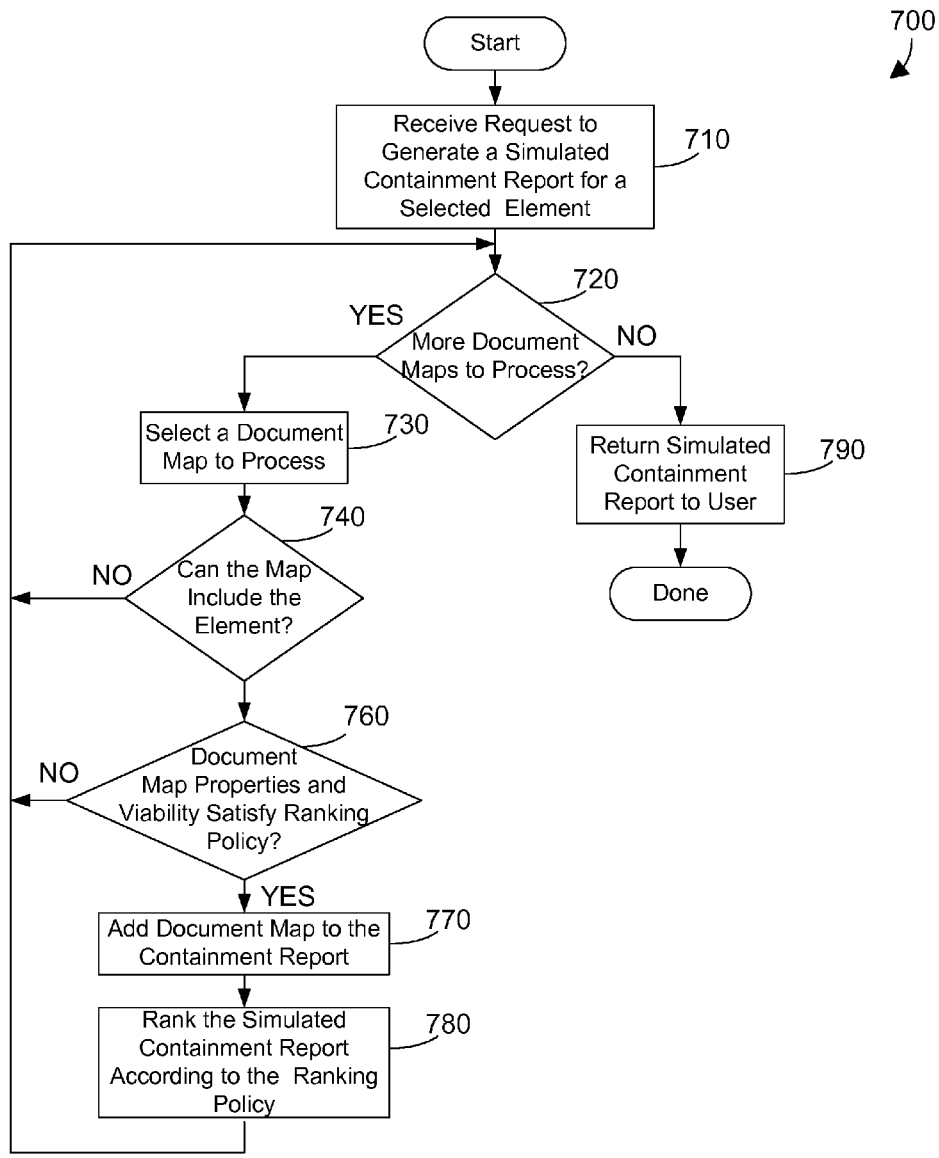
FIG. 7 is a flow diagram of a method that represents one specific implementation of method 600 in FIG. 6.

Method 700 in FIG. 7 is one specific implementation for method 600 in FIG. 6. The request to generate a simulated containment report for a selected element is received (step 710). If there are more document maps to process (step 720=YES), then one of the remaining document maps is selected to be processed (step 730). If the document map can include the element (e.g. the document map's schema allows elements of that type; step 740=YES), then the document map's properties (e.g., 155 in FIG. 1) and viability (e.g., 154 in FIG. 1) are checked against the ranking policy (e.g., 180 in FIG. 1). If the document map's properties and viability satisfy the ranking policy (step 760=YES), then the document map is added to the simulated containment report (step 770). The simulated containment report is then ranked according to the ranking policy (step 780), and method 700 returns to step 720. If there are more document maps to process (step 720=YES), then one of the remaining document maps is selected be processed (step 730). If the document map can include the element (step 740=YES), but the document map's properties or viability do not satisfy the ranking policy (step 760=NO), method 700 returns to step 720. If there are more document maps to process (step 720=YES), then one of the remaining document maps is selected to be processed (step 730). If the document map cannot include the element (step 740=NO), then method 700 returns to step 720. Once there are no more document maps to process (step 720=NO), then the simulated containment report is returned to the user (step 790), and method 700 is done.

Viability value 154 for each document map 153 is determined according to viability policy 176. Viability policy 176 preferably includes criteria based on probability 256, popularity 257, and recent usage 258 as shown in FIG. 2. For example, if a document map's popularity is high, and the document map was used within the last month, the document map's viability could be assigned the value "high." While the viability values "high", "medium", and "low" are the only viability values discussed herein, the specification and claims expressly extend to any number or type of viability value. Note the viability values of high, medium and low are fuzzy values that may be defined in any suitable way, allowing fuzzy logic techniques to be used in determining an appropriate viability value for a document map, and for determining whether the viability value satisfies the ranking policy.

Figure 8:
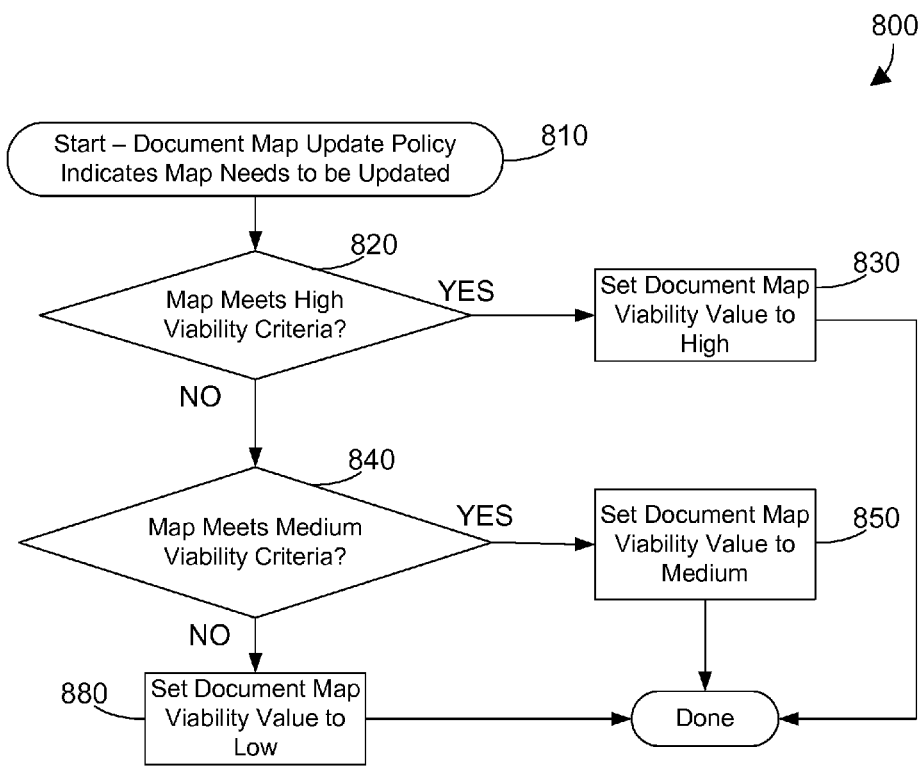
FIG. 8 is a flow diagram of a method for updating the viability value of a document map in the repository.

Referring to FIG. 8, a method 800 shows one suitable method for updating a document map's viability value. Method 800 starts when the document map update policy indicates that a document map needs to be updated (step 810). If the document map meets the high viability criteria (step 820=YES), then the document map's viability value is set to "high" (step 830) and method 800 is done. If the document map does not meet the high viability criteria (step 820=NO), then method 800 moves to step 840. If the document map meets the medium viability criteria (step 840=YES), then the document map's viability value is set to "medium" (step 850) and method 800 is done. If the document map does not meet the medium viability criteria (step 840=NO), then the document map's viability value is set to "low" (step 860) and method 800 is done.

As shown in FIG. 8, one suitable implementation of viability criteria is to define "low" as the default viability. Another suitable implementation is to explicitly define each viability value. While the default implementation is discussed herein, the specification and claims herein expressly extend to any way to define a viability value for a document map in a content management system.

Figure 9:
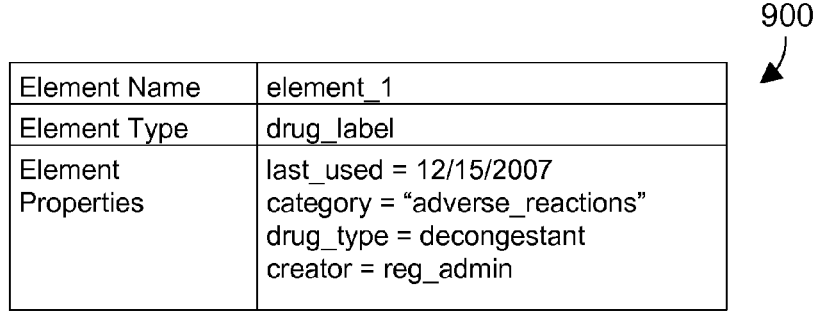
FIGS. 9-11 show sample elements for a specific example herein.
Figure 10:
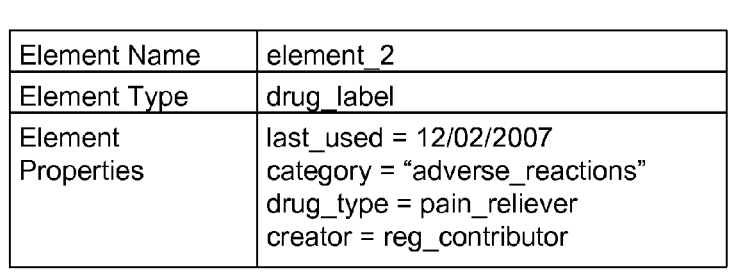
Figure 11:
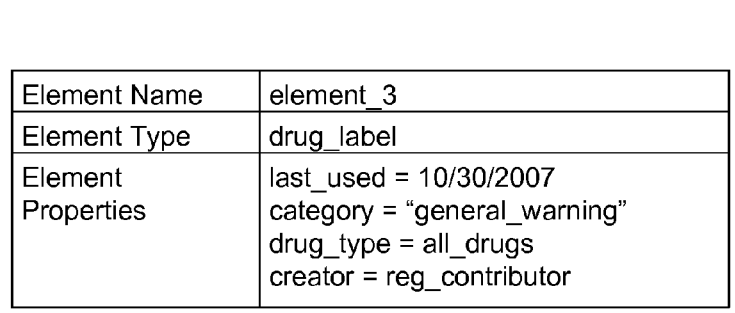
Figure 12:
FIG. 12 shows a first sample document map for the specific example herein.
Figure 13:
FIG. 13 shows a sample set of logged properties in the form of link data for document map 1200 in FIG. 12 indicating popularity of the elements.
Figure 14:
FIG. 14 shows a second sample document map for the specific example herein.
Figure 15:
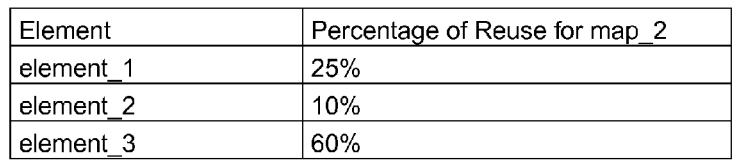
FIG. 15 shows a sample set of logged properties in the form of link data for document map 1400 in FIG. 14 indicating popularity of the elements.
Figure 16:
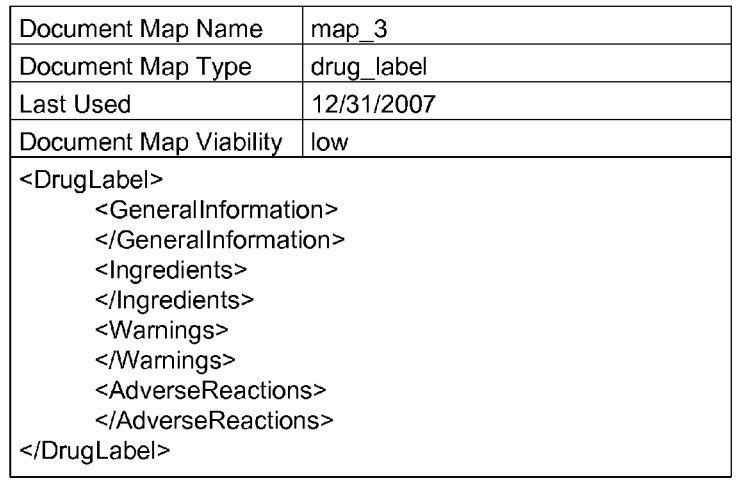
FIG. 16 shows a third sample document map for the specific example herein.
Figure 17:
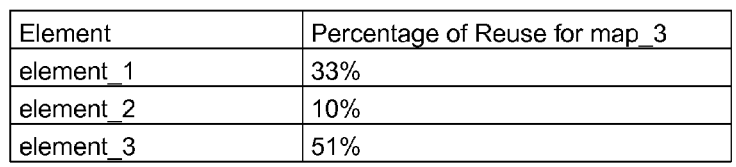
FIG. 17 shows a sample set of logged properties in the form of link data for document map 1600 in FIG. 16 indicating popularity of the elements.
Figure 19:
FIGS. 19-21 show sample ranking policies with FIG. 21 being used for the specific example herein.
Figure 20:
Figure 21:

Two simple examples are now given using FIGS. 9-29 to illustrate the methods of FIGS. 3-4 and 6-7. In the current examples we will use SCORE's XML content management system by IBM. While the examples herein discuss SCORE's XML content management system as one possible example of a content management system, the disclosure and claims herein expressly extend to any content management system. For the examples herein, FIGS. 9-11 show elements 900, 1000, and 1100, respectively, that reside in a repository (e.g., 150 in FIG. 1). FIGS. 12, 14, and 16 show document maps 1200, 1400, and 1600 that also reside in the repository. FIGS. 13, 15, and 17 show sample sets of link data 1300, 1500, and 1700 for document maps 1200, 1400, and 1600 respectively. Note the link data shown in FIGS. 13, 15 and 17 are suitable examples of logged properties 155 stored in the content management system. FIG. 18 shows a sample viability policy 1800 for the two examples discussed herein. FIGS. 19-21 show sample ranking policies 1900, 2000, and 2100. Ranking policy 2100 is used for the two examples discussed herein. In the first example we assume the logged properties (i.e., 155 in FIG. 1) indicate the probability for document maps 1200, 1400, and 1600 is high. In the second example we assume the logged properties indicate the probability for document maps 1400 and 1600 is high while the probability for document map 1200 is less than high.

We assume for the purposes of the examples herein that the document map update policy (e.g., 174 in FIG. 1) indicates that the viability should be updated when a request is received from a user to generate a containment report and the document map can contain the element (e.g. the document map's schema allows elements of that type). Other implementations could update the viability on a periodic basis, thus the steps in the example to update the viability would not be needed in those implementations. Thus when the user requests a containment report for element 900, the document map update policy indicates the document map's viability value needs to be updated if the document map can contain element 900 (step 810 in FIG. 8).

In the first example, a user requests a containment report for element 900 in FIG. 9 (step 710 in FIG. 7). There are three document maps left to process (step 720=YES in FIG. 7), so we first select document map 1200 in FIG. 12 as the document map to process (step 730 in FIG. 7). Since document map 1200 and element 900 are of the same document type (e.g. "drug_label"), document map 1200 can include element 900 (step 740=YES in FIG. 7).

The document map update policy indicates the viability value for document map 1200 needs to be updated because the document map can contain the element (step 810 in FIG. 8). Viability policy 1800 defines how to assign the viability value for a document map. According to viability policy 1800 in FIG. 18, a document map is assigned a viability value of "high" when the document map's probability is high, the document map's popularity is greater than 50 percent, and the document map last used an element the same type as element 900 after Dec. 10, 2007. A document map is assigned a viability value of "medium" when the document map's probability is high or the document map's popularity is between 25 and 50 percent, or the document map was last used between Nov. 1, 2007 and Jan. 1, 2008. A document map is assigned a viability value of "low" as the default (i.e. when it does not meet the high or medium criteria). For document map 1200, the probability is high, document map 1200 reuses element 900 55 percent of the time as shown in FIG. 13, and document map 1200 last used an element of the same type as element 900 on Dec. 31, 2007, as shown in FIG. 12. Thus document map 1200 meets all of the criteria for high viability (step 820=YES in FIG. 8), and document map 1200 is assigned a viability value of "high" shown in FIG. 22 (step 830 in FIG. 8).

Figure 22:
FIG. 22-24 show the sample document maps 1200, 1400, and 1600, respectively, after the viability has been updated according to viability policy 1800 in FIG. 18 when generating a simulated containment report for element 900 in FIG. 9.

Now that document map 1200 has been updated, shown as document map 1200 in FIG. 22, the simulated containment report generation mechanism checks the document map against ranking policy 2100 to determine if document map 1200 can be added to the simulated containment report (step 760 in FIG. 7). Ranking policy 2100 allows document maps with viability values "high" or "medium" to be included into the simulated containment report shown in FIG. 21. Since document map 1200 has a viability value "high" (step 760=YES in FIG. 7), it is added to the simulated containment report (step 770 in FIG. 7). The simulated containment report is ranked according to popularity based on ranking policy 2100 (step 780 in FIG. 7).

Since there are two more document maps to process (step 720=YES in FIG. 7), we select document map 1400 in FIG. 14 as the document map to process (step 730 in FIG. 7). Document map 1400 and element 900 are of the same document type (e.g. "drug_label"), so document map 1400 can include element 900 (step 740=YES in FIG. 7). The document map update policy indicates the viability value for document map 1400 needs to be updated because the document map can contain the element (step 810 in FIG. 8). For document map 1400, the probability is high, document map 1400 reuses element 900 25 percent of the time as shown in FIG. 15, and document map 1400 last used an element of the same type as element 900 on Dec. 31, 2007, as shown in FIG. 14. Thus document map 1400 does not meet the criteria for high viability (step 820=NO in FIG. 8), but document map 1400 does meet the criteria for medium viability (step 840=YES in FIG. 8), and document map 1400 is assigned a viability value of "medium" shown in FIG. 23 (step 850 in FIG. 8).

Figure 23:

Now that document map 1400 has been updated, shown as document map 1400 in FIG. 23, the simulated containment report generation mechanism checks the document map against ranking policy 2100 to determine if document map 1400 can be added to the simulated containment report (step 760 in FIG. 7). Ranking policy 2100 allows document maps with viability values "high" or "medium" to be included into the simulated containment report shown in FIG. 21. Since document maps 1400 has a viability value "medium" (step 760=YES in FIG. 7), it is added to the simulated containment report (step 770 in FIG. 7). The simulated containment report is ranked according to popularity based on ranking policy 2100 (step 780 in FIG. 7). However, since document 1200 has viability "high" and document 1400 has viability "medium," document 1200 will always be ranked higher in the simulated containment report despite the popularity. The only time the properties (e.g. recent usage, popularity, or probability) are used to rank the simulated containment report is when there are document maps that have the same viability. Thus all of the document maps with viability value "high" will be ranked according to the properties defined in the ranking policy. Then all of the document maps with viability value "medium" will be ranked according to the properties defined in the ranking policy, but will be below all of the document maps with viability value "high." Finally all of the document maps with viability value "low" will be ranked according to the properties defined in the ranking policy, but will be below all of the document maps with viability value "high" or "medium."

Since there is one more document map to process (step 720=YES in FIG. 7), we select document map 1600 in FIG. 16 as the document map to process (step 730 in FIG. 7). Document map 1600 and element 900 are of the same document type (e.g. "drug_label"), so document map 1600 can include element 900 (step 740=YES in FIG. 7). The document map update policy indicates the viability value for document map 1600 needs to be updated because the document map can contain the element (step 810 in FIG. 8). For document map 1600, the probability is high, document map 1600 reuses element 900 33 percent of the time as shown in FIG. 17, and document map 1600 last used an element of the same type as element 900 on Dec. 31, 2007, as shown in FIG. 16. Thus document map 1600 does not meet the criteria for high viability (step 820=NO in FIG. 8), but document map 1400 does meet the criteria for medium viability (step 840=YES in FIG. 8), and document map 1400 is assigned a viability value of "medium" shown in FIG. 24 (step 850 in FIG. 8).

Figure 24:
Figure 25:
FIG. 25 shows a sample simulated containment report for element 900 in FIG. 9.

Now that document map 1600 has been updated, shown as document map 1600 in FIG. 24, the simulated containment report generation mechanism checks the document map against ranking policy 2100 to determine if document map 1600 can be added to the simulated containment report (step 760 in FIG. 7). Ranking policy 2100 allows document maps with viability values "high" or "medium" to be included into the simulated containment report shown in FIG. 21. Since document maps 1600 has a viability value "medium" (step 760=YES in FIG. 7), it is added to the simulated containment report (step 770 in FIG. 7). The simulated containment report is ranked according to popularity based on ranking policy 2100 (step 780 in FIG. 7). Now since there are no more document maps to process (step 720=NO in FIG. 7), the simulated containment report is returned to the user (step 790 in FIG. 7) and is shown as simulated containment report 2500 in FIG. 25. Notice that the final ranking shown in simulated containment report 2500 has map_1 with a viability value "high" ranked above both map_2 and map_3 that have a viability value "medium," and that map_2 and map_3, that have the same viability value "medium," are ranked according to the popularity of the document (e.g. the percent each document map used the selected element) per ranking policy 2100.

In the second example, a user requests a containment report for element 1100 in FIG. 11 (step 710 in FIG. 7). There are three document maps left to process (step 720=YES in FIG. 7), so we will select document map 1200 in FIG. 12 as the document map to process (step 730 in FIG. 7). Since document map 1200 and element 1100 are of the same document type (e.g. "drug_label"), document map 1200 can include element 1100 (step 740=YES in FIG. 7).

The document map update policy indicates the viability value for document map 1200 needs to be updated because the document map can contain the element (step 810 in FIG. 8). For document map 1200, the probability is less than high, document map 1200 reuses element 1100 zero percent of the time as shown in FIG. 13, and document map 1200 last used an element of the same type as element 1100 on Dec. 31, 2007, as shown in FIG. 12. Thus document map 1200 does not meet the criteria for high viability (step 820=NO in FIG. 8), but document map 1200 does meet the criteria for medium viability (step 840=YES in FIG. 8), and document map 1200 is assigned a viability value of "medium" shown in FIG. 26 (step 850 in FIG. 8).

Figure 26:
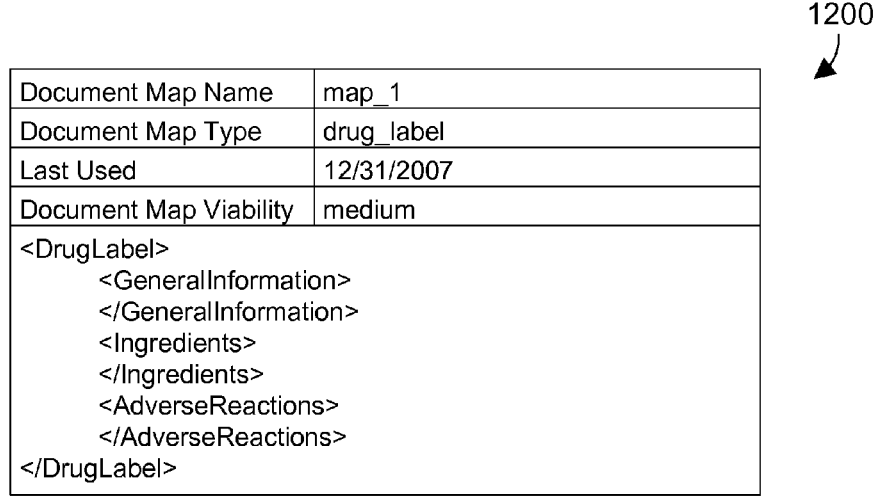
FIGS. 26-28 show the sample document maps 1200, 1400, and 1600 after the viability has been updated according to the viability policy 1800 in FIG. 18 when generating a simulated containment report for element 1100 in FIG. 11.

Now that document map 1200 has been updated, shown as document map 1200 in FIG. 26, the simulated containment report generation mechanism checks the document map against ranking policy 2100 to determine if document map 1200 can be added to the simulated containment report (step 760 in FIG. 7). Ranking policy 2100 allows document maps with viability values "high" or "medium" to be included into the simulated containment report shown in FIG. 21. Since document maps 1200 has a viability value "medium" (step 760=YES in FIG. 7), it is added to the simulated containment report (step 770 in FIG. 7). The simulated containment report is ranked according to popularity based on ranking policy 2100 (step 780 in FIG. 7).

Since there are two more document maps to process (step 720=YES in FIG. 7), we select document map 1400 in FIG. 14 as the document map to process (step 730 in FIG. 7). Document map 1400 and element 1100 are of the same document type (e.g. "drug_label"), so document map 1400 can include element 1100 (step 740=YES in FIG. 7). The document map update policy indicates the viability value for document map 1400 needs to be updated because the document map can contain the element (step 810 in FIG. 8). For document map 1400, the probability is high, document map 1400 reuses element 1100 60 percent of the time as shown in FIG. 15, and document map 1400 last used an element of the same type as element 1100 on Dec. 31, 2007, as shown in FIG. 14. Thus document map 1400 meets the criteria for high viability (step 820=YES in FIG. 8), and document map 1400 is assigned a viability value of "high" shown in FIG. 27 (step 850 in FIG. 8).

Figure 27:
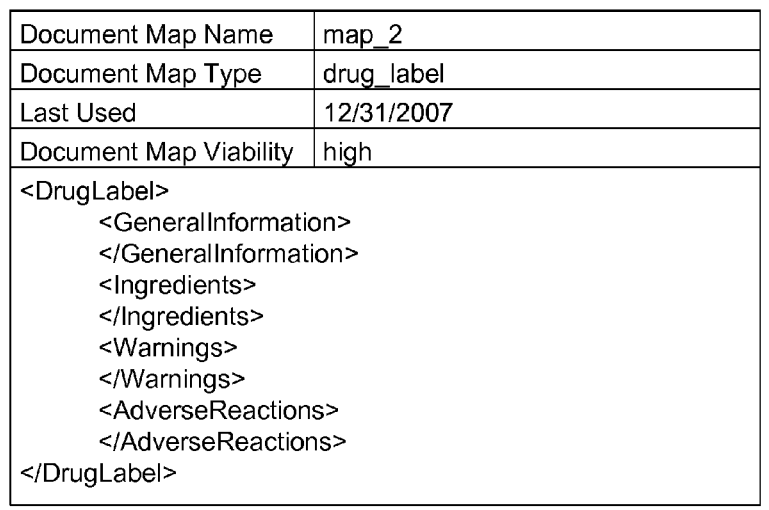

Now that document map 1400 has been updated, shown as document map 1400 in FIG. 27, the simulated containment report generation mechanism checks the document map against ranking policy 2100 to determine if document map 1400 can be added to the simulated containment report (step 760 in FIG. 7). Ranking policy 2100 allows document maps with viability values "high" or "medium" to be included into the simulated containment report shown in FIG. 21. Since document maps 1400 has a viability value "high" (step 760=YES in FIG. 7), it is added to the simulated containment report (step 770 in FIG. 7). The simulated containment report is ranked according to popularity based on ranking policy 2100 (step 780 in FIG. 7). However, since document 1400 has viability "high" and document 1200 has viability "medium," document 1400 will always be ranked higher in the simulated containment report despite the popularity.

Since there is one more document map to process (step 720=YES in FIG. 7), we select document map 1600 in FIG. 16 as the document map to process (step 730 in FIG. 7). Document map 1600 and element 1100 are of the same document type (e.g. "drug_label"), so document map 1600 can include element 1100 (step 740=YES in FIG. 7). The document map update policy indicates the viability value for document map 1600 needs to be updated because the document map can contain the element (step 810 in FIG. 8). For document map 1600, the probability is high, document map 1600 reuses element 1100 51 percent of the time as shown in FIG. 17, and document map 1600 last used an element of the same type as element 1100 on Dec. 31, 2007, as shown in FIG. 16. Thus document map 1600 meets the criteria for high viability (step 820=YES in FIG. 8), and document map 1400 is assigned a viability value of "high" shown in FIG. 28 (step 850 in FIG. 8).

Figure 28:
Figure 29:
FIG. 29 shows a sample simulated containment report for element 1100 in FIG. 11.

Now that document map 1600 has been updated, shown as document map 1600 in FIG. 28, the simulated containment report generation mechanism checks the document map against ranking policy 2100 to determine if document map 1600 can be added to the simulated containment report (step 760 in FIG. 7). Ranking policy 2100 allows document maps with viability values "high" or "medium" to be included into the simulated containment report shown in FIG. 21. Since document maps 1600 has a viability value "high" (step 760=YES in FIG. 7), it is added to the simulated containment report (step 770 in FIG. 7). The simulated containment report is ranked according to popularity based on ranking policy 2100 (step 780 in FIG. 7). Now since there are no more document maps to process (step 720=NO in FIG. 7), the simulated containment report is returned to the user (step 790 in FIG. 7) and is shown as simulated containment report 2900 in FIG. 29. Notice that the final ranking shown in simulated containment report 2900 has map_2 and map_3 with a viability value "high" above map_1 that has a viability value "medium," and that map_2 and map_3, that have the same viability value "high," are ranked according to the popularity of the document (e.g. the percent each document map used the selected element) per ranking policy 2100.

The specific examples herein show a viability policy separate from the ranking policy. Another suitable implementation would be to simply have the viability policy contained in the ranking policy. Thus the ranking policy would be defined in terms of the logged properties directly without assigning a distinct viability value. The disclosure and claims herein expressly extend to the ranking policy and viability being separate or combined.

The disclosure and claims herein allow taking into account properties of document maps that are not represented in any explicit relationships in the repository. This allows a simulated containment report to be generated for elements that are used on-the-fly. In one specific implementation described herein, properties that represent probability, popularity and recent usage of document maps are logged, and a viability policy then determines a viability value for a document map based on the logged properties. A ranking policy is also defined in terms of the viability value of a document map.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future.

The invention claimed is:

1. An apparatus comprising:
at least one processor;
a memory coupled to the at least one processor;
a repository residing in the memory that includes a plurality of elements and a plurality of document maps;
a content management system residing in the memory and executed by the at least one processor, the content management system managing the plurality of elements and the plurality of document maps in the repository, wherein each of the plurality of document maps defines a document that is dynamically generated and includes at least one element that does not have any explicit relationship in the repository, the content management system comprising:
properties for the plurality of document maps in the repository that are not represented in any explicit relationships in the repository and that represent potential for each of the plurality of document maps to reuse the plurality of elements when a document is dynamically generated from one of the plurality of document maps, wherein the properties are logged when documents corresponding to the plurality of document maps are dynamically generated by the content management system, wherein the properties comprise probability of reuse, popularity of use, and time of recent usage;
a ranking policy that specifies criteria for including and ranking the plurality of document maps in a simulated containment report according to the properties when a user makes a request to generate the simulated containment report for a selected one of the plurality of elements, the simulated containment report specifying which of the plurality of document maps can contain the selected one element; and
a simulated containment report generation mechanism that receives the request to generate a simulated containment report for the selected one element, determines when the properties for each of the plurality of document maps satisfy the ranking policy, and when the properties for a selected one document map satisfy the ranking policy, the simulated containment report generation mechanism adds the selected one document map to the simulated containment report, and when the properties for the selected one document map do not satisfy the ranking policy, the simulated containment report generation mechanism does not add the selected one document map to the simulated containment report;
a viability generation mechanism that generates a viability value for the selected one document map from the properties and from a viability policy that specifies criteria for setting the viability value according to the probability of reuse, popularity of use, and time of recent usage of the selected one element.

2. The apparatus of claim 1 further comprising a document map update policy that specifies when the viability value for the selected one document map should be updated.

3. The apparatus of claim 1 wherein results in the simulated containment report are ranked according to the ranking policy.

4. The apparatus of claim 3 wherein the results are ranked according to at least one of the properties.

5. An article of manufacture comprising:
(A) a content management system that manages a plurality of elements and a plurality of document maps in a repository, wherein each of the plurality of document maps defines a document that is dynamically generated and includes at least one element that does not have any explicit relationship in the repository, the content management system comprising:

properties for the plurality of document maps in the repository that are not represented in any explicit relationships in the repository and that represent potential for each of the plurality of document maps to reuse the plurality of elements when a document is dynamically generated from one of the plurality of document maps, wherein the properties are logged when documents corresponding to the plurality of document maps are dynamically generated by the content management system, wherein the properties comprise probability of reuse, popularity of use, and time of recent usage;

a ranking policy that specifies criteria for including and ranking the plurality of document maps in a simulated containment report according to the properties when a user makes a request to generate a simulated containment report for a selected one of the plurality of elements, the simulated containment report specifying which of the plurality of document maps can contain the selected one element;

a simulated containment report generation mechanism that receives the request to generate a simulated containment report for the selected one element, determines when the properties for each of the plurality of document maps satisfy the ranking policy, and when the properties for a selected one document map satisfies the ranking policy, the simulated containment report generation mechanism adds the selected one document map to the simulated containment report, and when the properties for the selected one document map do not satisfy the ranking policy, the simulated containment report generation mechanism does not add the selected one document map to the simulated containment report; and a viability generation mechanism that generates a viability value for the selected one document map from the properties and from a viability policy that specifies criteria for setting the viability value according to the probability of reuse, popularity of use, and time of recent usage of the selected one element; and (B) non-transitory recordable media bearing the content management system.

6. The article of manufacture of claim 5 further comprising a document map update policy that specifies when the viability value for the selected one document map should be updated.

7. The article of manufacture of claim 5 wherein the results in the simulated containment report are ranked according to the ranking policy.

8. The article of manufacture of claim 7 wherein the results are ranked according to at least one of the properties.

9. An apparatus comprising:
at least one processor;
a memory coupled to the at least one processor;
a repository residing in the memory that includes a plurality of elements and a plurality of document maps;
a content management system residing in the memory and executed by the at least one processor, the content management system managing the plurality of elements and the plurality of document maps in the repository, wherein each of the plurality of document maps defines a document that is dynamically generated and includes at least one element that does not have any explicit relationship in the repository, the content management system comprising:

properties for the plurality of document maps in the repository that are not represented in any explicit relationships in the repository and that represent potential for each of the plurality of document maps to reuse the plurality of elements when a document is dynamically generated from one of the plurality of document maps, wherein the properties are logged when documents corresponding to the plurality of document maps are dynamically generated by the content management system, wherein the properties comprise probability of reuse, popularity of use, and time of recent usage;

a ranking policy that specifies criteria for including and ranking the plurality of document maps in a simulated containment report according to the properties when a user makes a request to generate the simulated containment report for a selected one of the plurality of elements, the simulated containment report specifying which of the plurality of document maps can contain the selected one element; and a simulated containment report generation mechanism that performs the steps of:
(A) defining a viability policy that specifies criteria for setting a viability value for each of the plurality of document maps in the repository according to the probability of reuse, popularity of use, and time of recent usage of each document map;
(B) setting the viability value for each of the plurality of document maps in the repository according to criteria in the viability policy;
(C) periodically updating the viability value for each of the plurality of document maps according to a user-defined document map update policy;
(D) receiving from a user a request to generate a simulated containment report for the selected element;
(E) selecting one of the document maps from the plurality of document maps;
(F) determining whether the viability value for the selected one document map satisfies a user-defined ranking policy that specifies criteria in terms of probability each document map will be used, past usage of each document map, and last time each document map was used;
(G) when the viability value of the selected one document map satisfies the ranking policy, adding the selected one document map to the simulated containment report;
(H) when the viability value of the selected one document map does not satisfy the ranking policy, not adding the selected one document map to the simulated containment report;
(I) repeating steps (E)-(H) for each of the plurality of document maps in the repository;
(J) ranking the simulated containment report according to at least one of the properties in the simulated containment report as defined in the ranking policy; and
(K) returning the simulated containment report to the user.

* * * * *